United States Patent
Williams et al.

(10) Patent No.: US 11,724,931 B2
(45) Date of Patent: Aug. 15, 2023

(54) VEHICLE SEAT CORRECTION SYSTEM AND METHOD OF CORRECTING A DEFECT IN A VEHICLE SEAT

(71) Applicant: Lear Corporation, Southfield, MI (US)

(72) Inventors: Andrew Williams, Stratford Upon Avon (GB); Christopher Giles Humphrey, Coventry (GB); Mark Ramsden, Alcester (GB); Daniel Vera, Barrow Upon Soar (GB); Jiayi Zhang, Coventry (GB); Fengjia Yao, Coventry (GB); Alexander Keller, Coventry (GB)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/482,972

(22) Filed: Sep. 23, 2021

(65) Prior Publication Data

US 2023/0093440 A1    Mar. 23, 2023

(51) Int. Cl.
*B68G 15/00* (2006.01)
*B60N 2/58* (2006.01)
(Continued)

(52) U.S. Cl.
CPC .............. *B68G 15/00* (2013.01); *B60N 2/00* (2013.01); *B60N 2/5891* (2013.01); *D06F 75/20* (2013.01); *G01N 21/95* (2013.01)

(58) Field of Classification Search
CPC ......... D06F 75/20; B60N 2/5891; B60N 2/00; G01N 21/95
See application file for complete search history.

(56) References Cited

U.S. PATENT DOCUMENTS

| 7,197,239 B1 * | 3/2007 | Grande | ................ B60N 2/5891 |
| | | | 392/418 |
| 10,839,506 B1 * | 11/2020 | Raghu | ................... G06T 7/0004 |

(Continued)

FOREIGN PATENT DOCUMENTS

| CN | 106226325 B | * | 7/2019 | ............. G01N 21/01 |
| CN | 112232399 A | * | 1/2021 | ......... G01N 21/8851 |

(Continued)

OTHER PUBLICATIONS

KR-102327595-B1 Machine Translation (Google) (Year: 2021).*

(Continued)

*Primary Examiner* — Michael W Hotchkiss
(74) *Attorney, Agent, or Firm* — MacMillan, Sobanski & Todd, LLC

(57) ABSTRACT

An example method of correcting a defect in a seat comprises the steps of: (a) imaging a seat to obtain an image of the seat, a portion of the seat having a defect; (b) applying a localized boundary around the portion of the seat having the defect within the image of the seat; (c) translating the localized boundary into a seat specific map of a baseline model of the seat such that a portion of the baseline model of the seat that corresponds to the portion of the seat having the defect within the image of the seat is disposed within a translated localized boundary; (d) selecting a predetermined path for an automated device to correct the portion of the seat having the defect based on the portion of the baseline model of the seat; and (e) correcting the portion of the seat having the defect.

20 Claims, 6 Drawing Sheets

(51) Int. Cl.
*D06F 75/20* (2006.01)
*B60N 2/00* (2006.01)
*G01N 21/95* (2006.01)

(56) References Cited

U.S. PATENT DOCUMENTS

| | | | |
|---|---|---|---|
| 10,984,523 B2 * | 4/2021 | Takahashi | G06T 7/0006 |
| 2007/0137014 A1 * | 6/2007 | Montgomery | D06F 73/00 |
| | | | 29/91 |
| 2019/0120774 A1 * | 4/2019 | Whitens | G01N 21/95607 |
| 2020/0141049 A1 * | 5/2020 | Clowes | D06F 35/00 |
| 2020/0300620 A1 * | 9/2020 | Lee | G01B 21/20 |

FOREIGN PATENT DOCUMENTS

| | | | | |
|---|---|---|---|---|
| DE | 102018217733 A1 | | 4/2020 | |
| DE | 102018222655 A1 | * | 7/2020 | G01N 21/94 |
| KR | 101438540 B1 | * | 9/2014 | B25J 9/02 |
| KR | 102255019 B1 | * | 5/2021 | D06F 75/20 |
| KR | 102327595 B1 | * | 11/2021 | D06F 75/20 |
| KR | 102354314 B1 | * | 1/2022 | B62D 65/00 |
| WO | WO-2021083941 A1 | * | 5/2021 | G01N 21/8806 |

OTHER PUBLICATIONS

KR-102255019-B1 Machine Translation (Google) (Year: 2021).*
KR-102354314-B1 Machine Translation (Google) (Year: 2022).*
DE-102018222655-A1 Machine Translation (Google) (Year: 2020).*
CN-106226325-B machine translation (Year: 2019).*
CN-112232399-A machine translation (Year: 2021).*
KR101438540B1 machine translation (Year: 2014).*
Stiefenhofer, "Green and efficient: 3D vision system checks car seats", Automation Technologies, Machine Vision, 2015, pp. 1-2.
Wu et al., "Study on Efficiency of Air Knife as Thermal Insulation with Two Spatial Opening", Proceedings of the 16th International Building Performance Simulation Association Conference, 2019, pp. 1756-1761.
German Office Action, Application No. 102022117519.7, dated Mar. 3, 2023.

* cited by examiner

| Value | Count |
|---|---|
| 75 | 6 |
| 125 | 37 |
| 175 | 18 |
| 200 | 19 |

VEHICLE SEAT CORRECTION SYSTEM AND METHOD OF CORRECTING A DEFECT IN A VEHICLE SEAT

FIELD

The disclosure relates generally to the field of correcting defects in a product. More particularly, the disclosure relates to vehicle seat correction systems and methods of correcting a defect in a vehicle seat.

BACKGROUND

Vehicles seats are generally manufactured in a production plant and then shipped to a separate assembly plant where the seats are installed into vehicles. Some vehicle seats are manufactured using leather and/or vinyl surface materials that are sewn and wrapped over foam. The seats are manually inspected subsequent to manufacture to confirm that the visual surface appearance in the materials forming the seats meets a standard set by the manufacturer (e.g., a 2D image based limit sample using what is known in the automotive industry as a Grey Book standard). The seats are then designated as pass or fail based on the visual surface appearance, which can vary based upon the type of material being used, foam density, material hardness and geometry, and the tolerances of sewn trim. In some cases, the visual surface appearance of a seat can include wrinkles, or other defects, in the surface material. Defects not meeting the standard set by the manufacturer are then rectified manually using heat or steam based finessing.

Manual inspection of defects, such as wrinkles, in vehicle seats can result in the application of inconsistent inspection judgement standards. Moreover, manual rectification of wrinkles in surface materials increases the time and labor required to finalize production of a vehicle seat, which increases the costs associated with manufacturing a vehicle seat. Furthermore, manual inspection and rectification of wrinkles can result in limited and/or inconsistent data being documented on a defect's location and severity, which prevents process and product improvements.

A need exists, therefore, for new and useful vehicle seat correction systems and methods of correcting a defect in a vehicle seat.

SUMMARY

Various example vehicle seat correction systems and methods of correcting a defect in a vehicle seat are described.

An example of a method of correcting a defect in a vehicle seat comprises the steps of: (a) imaging a seat to obtain an image of the seat, a portion of the seat having a defect; (b) applying a localized boundary around the portion of the seat having the defect within the image of the seat; (c) translating the localized boundary into a seat specific map of a baseline model of the seat such that a portion of the baseline model of the seat that corresponds to the portion of the seat having the defect within the image of the seat is disposed within a translated localized boundary; (d) selecting a predetermined path for an automated device to correct the portion of the seat having the defect based on the portion of the baseline model of the seat; and (e) correcting the portion of the seat having the defect using the automated device and the predetermined path for the automated device.

Additional understanding of these examples can be obtained by review of the detailed description, below, and the appended drawings.

DETAILED DESCRIPTION

The following detailed description and the appended drawings describe and illustrate various example vehicle seat correction systems and methods of correcting a defect in a vehicle seat. The description and illustration of these examples are provided to enable one skilled in the art to make and use a vehicle seat correction system and to practice a method of correcting a defect in a vehicle seat. They are not intended to limit the scope of the claims in any manner. Although the example systems and methods are described in the context of correcting a defect in a vehicle seat, it will be appreciated that the systems and methods described herein can be used to correct any type of defect in any seat and/or product.

Figure 1:
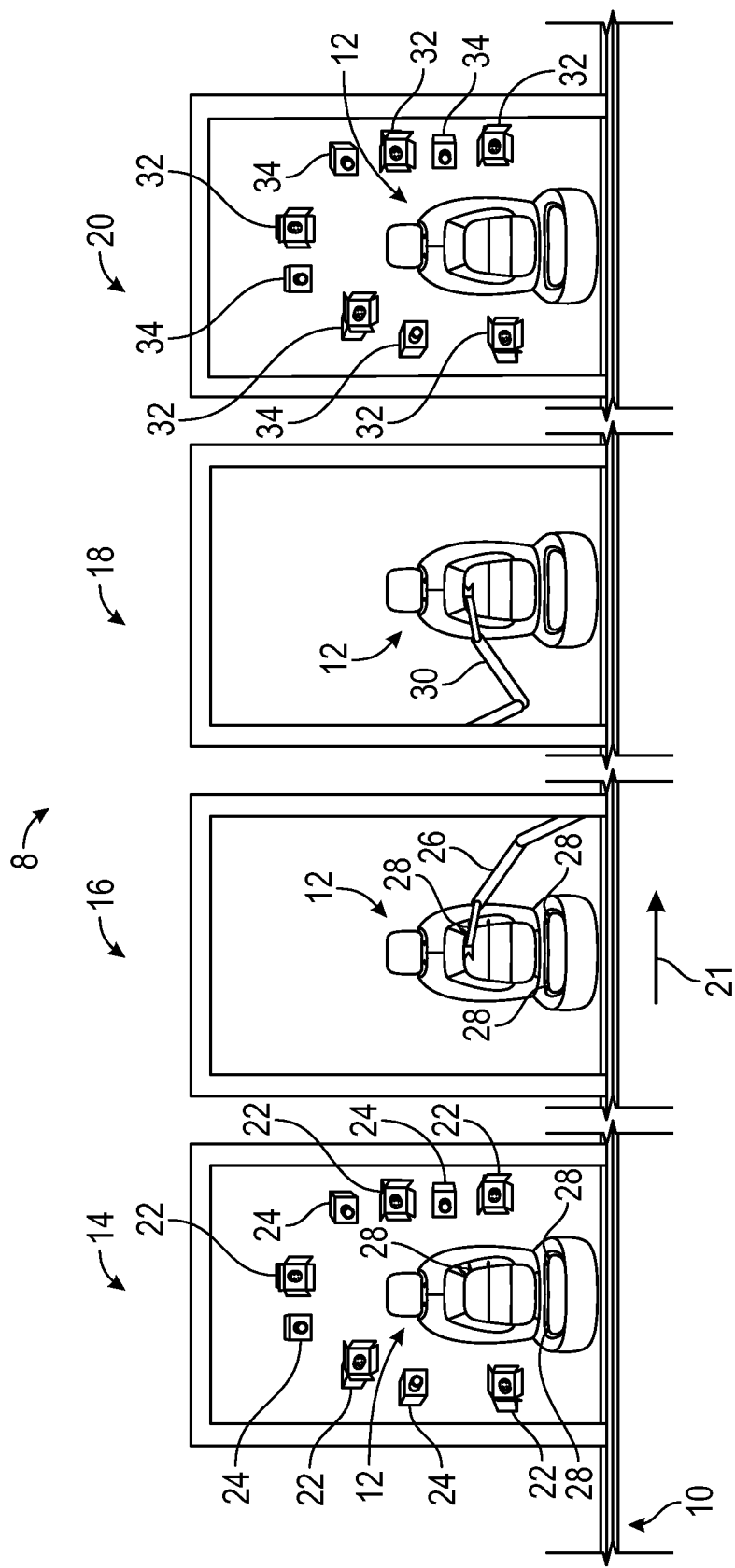
FIG. 1 illustrates a portion of a vehicle seat correction system.

FIG. 1 illustrates a vehicle seat correction system 8 that includes a conveyer 10, a vehicle seat 12, a first vehicle seat inspection station 14, a first vehicle seat correction station 16, a second vehicle seat correction station 18, and a second vehicle seat inspection station 20. The vehicle seat 12 is disposed on the conveyer 10, which transfers the vehicle seat 12 through the first vehicle seat inspection station 14, the first vehicle seat correction station 16, the second vehicle seat correction station 18, and the second vehicle seat inspection station 20 in the direction indicated by arrow 21. While a single seat has been illustrated as being transferred through the vehicle seat correction system 8, any suitable number of seats can be transferred through a vehicle seat correction system (e.g., such that a distinct seat is disposed within each station at the same time).

The first vehicle seat inspection station 14 includes a plurality of light sources 22 and a plurality of imaging devices 24. Upon actuation, the plurality of light sources 22 are configured to illuminate the vehicle seat 12 while it is positioned within the first vehicle seat inspection station 14 and/or while it is being imaged by one or more of the plurality of the imaging devices 24. Upon actuation, one or more of the plurality of imaging devices 24 are configured to capture an image of the vehicle seat 12 while the vehicle seat 12 is in the first vehicle seat inspection station 14. An image of the vehicle seat 12 can comprise any suitable image (e.g., 2D image, 3D image) stored in any suitable medium (e.g., computer-readable storage medium). In addition, an image of the vehicle seat 12 can be taken at any suitable angle (e.g., perpendicular, acute angle, obtuse angle) relative to any suitable portion of the vehicle seat 12. For example, an image can be taken of the front, rear, side, top, and/or bottom of any suitable portion of a vehicle seat, such as a head rest, armrest, backrest, and/or base. The plurality of light sources 22 and the plurality of imaging devices 24 may be electrically connected and/or configured to transmit data to and/or receive data from other components included in the first vehicle seat inspection station 14, other components disposed at another station, and/or other components disposed at a location distinct from the first vehicle seat inspection station 14 (e.g., server room), such as a monitor and/or a controller.

The first vehicle seat correction station 16 includes a first automated device 26 that, upon actuation, is configured to correct defects 28 identified on the vehicle seat 12 while the vehicle seat 12 is positioned within the first vehicle seat correction station 16. The defects 28 are identified using the image captured by one or more of the plurality of imaging devices 24, as described in more detail herein. The first automated device 26 may be electrically connected and/or configured to transmit data to and/or receive data from other components included in the first vehicle seat correction station 16, other components disposed at another station, and/or other components disposed at a location distinct from the first vehicle seat correction station 16 (e.g., server room), such as a monitor and/or a controller.

The first automated device 26 can include any tools considered suitable for correcting a defect in a vehicle seat and selection of a tool to include in an automated device can be based on various considerations, such as the type of defect being corrected. Examples of types of tools considered suitable to include in an automated device include heat sources (e.g., infra-red heating oven that can globally heat an entire surface or heat a zone with individual temperature control, infra-red gun, infra-red heating head that can be distance and time controlled either manually or using a robotic arm, steam iron, hot air gun), sources of compressed air, and any other tool considered suitable for a particular embodiment. For example, an arm of an automated device can include both a heat source and a source of compressed air disposed adjacent to, or surrounding the heat source, such that heat finessing of a first portion of a vehicle seat and cooling of a second portion of a vehicle seat can be accomplished simultaneously or separately. The tools included on an automated device can be used to correct any suitable defect, such as wrinkles in one or more panels of the seat trim, metal scratches that can be polished using an automated device, paint defects that can be polished or resprayed using an automated device, wrinkles in articles of clothing, and any other defect.

The second vehicle seat correction station 18 includes a second automated device 30 that, upon actuation, is configured to apply compressed air (e.g., high velocity air) on the portion of the vehicle seat 12 that was corrected by the first automated device 26 (e.g., the portion of the vehicle seat 12 that included the defects 28), or other portions of the vehicle seat 12 (e.g., portions of vehicle seat 12 disposed adjacent to the portion of the vehicle seat 12 that was corrected by the first automated device 26). This provides a mechanism to cool and/or set the portion of the vehicle seat 12 that was corrected by the first automated device 26, or other portions of the vehicle seat 12. The second automated device 30 may be electrically connected and/or configured to transmit data to and/or receive data from other components included in the second vehicle seat correction station 18, other components disposed at another station, and/or other components disposed at a location distinct from the second vehicle seat correction station 18 (e.g., server room), such as a monitor and/or a controller. Alternatively, if additional cooling is not required, the second vehicle seat correction station 18 can be omitted from a vehicle seat correction system. While the second automated device 30 has been described as configured to apply compressed air to a portion of a vehicle seat, a second automated device included in vehicle seat correction system can include any tool considered suitable to assist with correcting a defect on a vehicle seat, such as a high speed fan.

The second vehicle seat inspection station 20 includes a plurality of light sources 32 and a plurality of imaging devices 34. Upon actuation, the plurality of light sources 32 are configured to illuminate the vehicle seat 12 while it is positioned within the second vehicle seat inspection station 20 and/or while it is being imaged by one or more of the plurality of the imaging devices 34. Upon actuation, one or more of the plurality of imaging devices 34 are configured to capture an image of the vehicle seat 12 while the vehicle seat 12 is in the second vehicle seat inspection station 20. An image of the vehicle seat 12 can comprise any suitable image (e.g., 2D image, 3D image) stored in any suitable medium (e.g., computer-readable storage medium). In addition, an image of the vehicle seat 12 can be taken at any suitable angle (e.g., perpendicular, acute angle, obtuse angle) relative to any suitable portion of the vehicle seat 12. For example, an image can be taken of the front, rear, side, top, and/or bottom of any suitable portion of a vehicle seat, such as a head rest, armrest, backrest, and/or base. The plurality of light sources 32 and the plurality of imaging devices 34 may be electrically connected and/or configured to transmit data to and/or receive data from other components included in the second vehicle seat inspection station 20, other components disposed at another station, and/or other components disposed at a location distinct from the second vehicle seat inspection station 20 (e.g., server room), such as a monitor and/or a controller.

While the vehicle seat correction system 8 has been illustrated as including four stations, a vehicle seat correction system can include any suitable number of stations. For example, alternative embodiments can omit one or more of the stations described herein, include additional stations not described herein, combine one or more of the stations described herein into a single station (e.g., the first vehicle seat inspection station 14 can be combined with the second vehicle seat inspection station 20 and/or the first vehicle seat correction station 16 can be combined with the second vehicle seat correction station 20), and/or convey a vehicle seat in any suitable direction relative to one or more stations. While the vehicle seat inspection stations 14, 20 and vehicle seat correction stations 16, 18 have been illustrated at particular locations along the conveyer 10 and as including particular components, a vehicle seat inspection station and a vehicle seat correction station can be positioned at any suitable location on a conveyer and include any suitable number and type of components.

Figure 2:
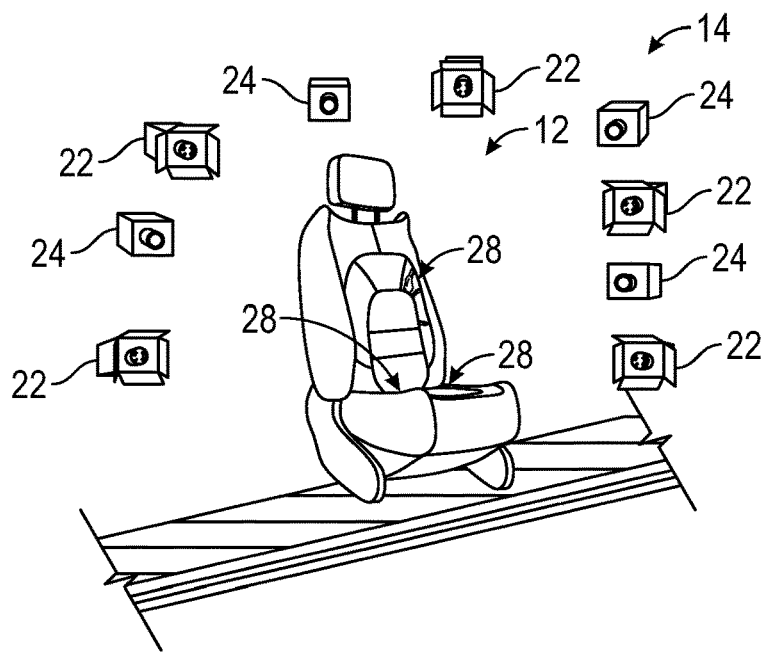
FIG. 2 is a partial perspective view of a vehicle seat positioned within a vehicle seat inspection station.
Figure 3:
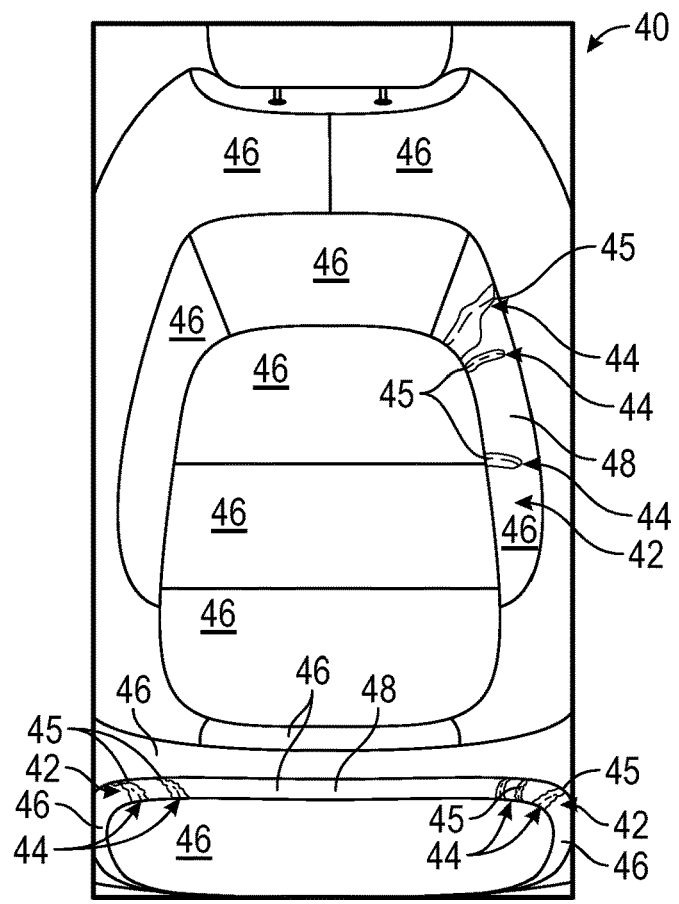
FIG. 3 is an image of the vehicle seat shown in FIG. 2. The vehicle seat includes defects.

FIGS. 2 and 3 illustrate a first step in a method of correcting a defect in a vehicle seat 12. As shown in FIG. 2, the vehicle seat 12 is positioned within a first vehicle seat inspection station, such as first vehicle seat inspection station 14 illustrated in FIG. 1. One or more of the plurality of light sources 22 and one or more of the plurality of imaging devices 24 are actuated such that an image 40 of the vehicle seat 12 is obtained by the one or more of the plurality of imaging devices 24. FIG. 3 illustrates the image 40 of the vehicle seat 12 obtained by the one or more of the plurality of imaging devices 24. As shown in FIG. 3, the image 40 illustrates that portions 42 of the vehicle seat 12 have defects 44. In the illustrated embodiment, the defects 44 are wrinkles 45. As shown, the vehicle seat 12 has a plurality of seat panels 46 and each panel in a subset of seat panels 48 of the plurality of seat panels 46 has a defect 44. While each seat panel in a subset of seat panels 48 has been illustrated as including a defect, a vehicle seat may have any suitable number of defects positioned at any suitable location on the vehicle seat 12. Examples of numbers of defects that may be included on a vehicle seat include zero, one, two, a plurality, three, four, five, and more than five. Examples of locations on a vehicle seat in which a defect may be positioned include on a portion of a vehicle seat, a single seat panel, a portion of a seat panel, a plurality of seat panels, a subset of a plurality of seat panels, and any other location on a vehicle seat. While the defects 44 have been illustrated as wrinkles 45, a defect can include any imperfection not meeting an applied standard (e.g., Grey Book standard).

Figure 4:
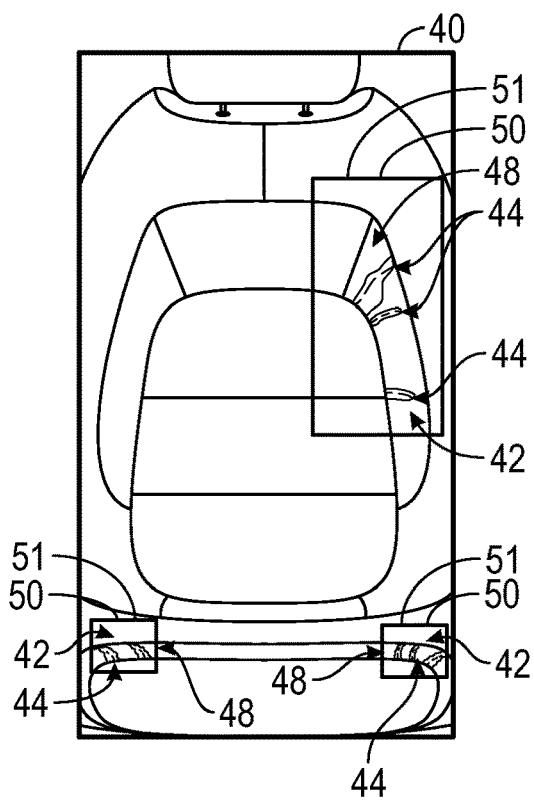
FIG. 4 illustrates a plurality of localized boundaries positioned around the defects in the image shown in FIG. 3.

FIG. 4 illustrates another step in a method of correcting a defect in a vehicle seat 12. As shown therein, localized boundaries 50 have been applied only to the portions 42 of the vehicle seat 12 that have a defect 44 within the image 40 of the vehicle seat 12 such that the portions 42 of the vehicle seat 12 that have a defect 44 within the image 40 of the vehicle seat 12 are disposed within the localized boundaries 50 (e.g., a portion of one or more seat panels, an entire seat panel, a plurality of seat panels). Such localized boundaries 50 can be applied using any suitable technique or method, such as manually, using a trained object detection machine learning model, or any other technique or method considered suitable for a particular embodiment. In the illustrated embodiment, the localized boundaries 50 are positioned such that the subset of seat panels 48 of the plurality of seat panels 46 that have the defect 44 within the image 40 of the vehicle seat 12 are disposed within a localized boundary 50. In the illustrated embodiment, the localized boundaries 50 are localized boundary boxes 51. However, in alternative embodiments, a localized boundary can have any suitable shape, such as circular, oval, rectangular, square, and any other shape considered suitable for a particular embodiment.

Figure 5:
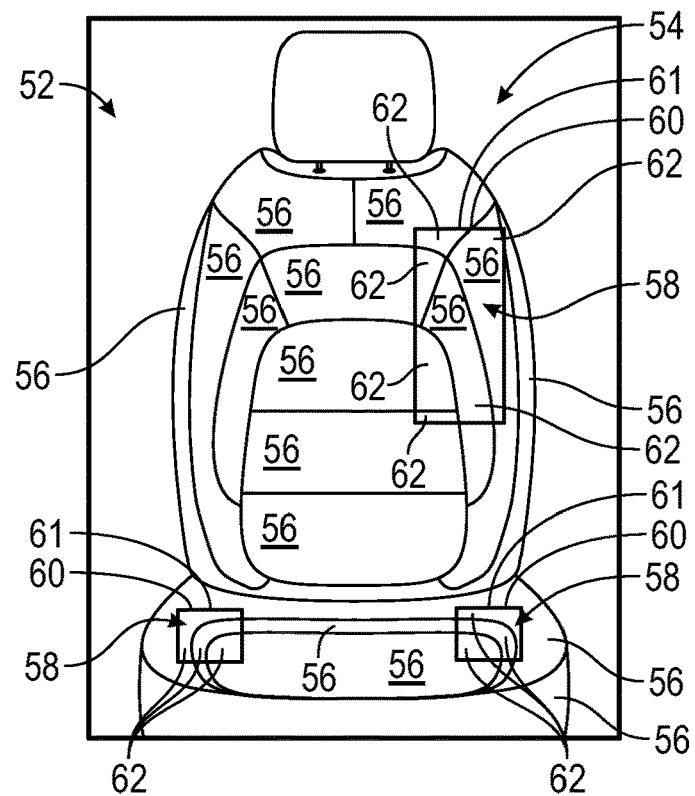
FIG. 5 is a seat specific map of a baseline model of the vehicle seat shown in FIG. 2. The localized boundaries shown in FIG. 4 have been translated into the seat specific map.

FIG. 5 illustrates another step in a method of correcting a defect in a vehicle seat 12. As shown therein, a seat specific map 52 is provided of a baseline model 54 of the vehicle seat 12. The baseline model 54 of the vehicle seat 12 includes a plurality of baseline seat panels 56. In the embodiment illustrated, the baseline model 54 is based on a trim geometry of the vehicle seat 12. However, alternative embodiments can include a baseline model that is based upon other characteristics, such as the type of material forming a vehicle seat (e.g., cloth, vinyl, leather, decorative materials, vinyl piping, decorative stitching, plastic) since different materials may require different defect correction techniques. Each baseline seat panel of the plurality of baseline seat panels 56 corresponds to a seat panel, or portion of a seat panel, of the plurality of seat panels 46 of the vehicle seat 12. For example, a baseline model of a vehicle seat can include a number of baseline seat panels that is the same as, greater than, or less than the number of seat panels included on a vehicle seat. In the embodiment illustrated, the baseline model 54 includes a number of baseline seat panels in the plurality of baseline seat panels 56 that is greater than the number of seat panels included in the plurality of seat panels 46 included in the vehicle seat 12. This allows for correction of a portion of seat panel of the plurality of seat panels 46 instead of the entirety of the seat panel when correcting a defect, as described herein. A baseline seat panel can comprise any suitable portion of a corresponding seat panel of a vehicle seat to accomplish greater quality control. For example, a baseline seat panel can comprise a quadrant, a half, a third, a fourth, a fifth, and any other portion of a corresponding seat panel of a vehicle seat considered suitable for a particular embodiment.

As shown in FIG. 5, the localized boundaries 50 in FIG. 4 have been translated into the seat specific map 52 of the baseline model 54 of the vehicle seat 12 as translated localized boundaries 60 and such that portions 58 of the baseline model 54 of the vehicle seat 12 that correspond to the portions 42 of the vehicle seat 12 that have a defect 44 within the image 40 of the vehicle seat 12 are disposed within translated localized boundaries 60 (e.g., a portion of one or more seat panels, an entire seat panel, a plurality of seat panels). In the illustrated embodiment, the localized boundaries 50 in FIG. 4 have been translated into the seat specific map 52 of the baseline model 54 of the vehicle seat 12 such that a subset of baseline seat panels 62 of the plurality of baseline seat panels 56 that correspond to the subset of seat panels 48 of the plurality of seat panels 46 that have the defect 44 within the image 40 of the vehicle seat 12 is disposed within a translated localized boundary 60.

Such translated localized boundaries 60 can be translated into a seat specific map 52 using any suitable technique or method, such as manually, image processing software (e.g., classical, machine learning based), using a CAD design of a vehicle seat, using a trained machine learning model, and any other technique or method considered suitable for a particular embodiment. When translating translated localized boundaries into a seat specific map manually, the trim geometry and seams can be selected and then the trim panels can be divided for automated correction (e.g., finessing). When translating translated localized boundaries into a seat specific map automatically, the trim geometry and seams can be selected automatically using image processing software (e.g., using classical, machine based learning, CAD design of a vehicle seat) and then the trim panels can be divided using machine learning (e.g., reinforced learning), which can utilize a feedback loop generated by imaging before and after correcting a defect, or a portion thereof. In the illustrated embodiment, the translated localized boundaries 60 have the same shape as the localized boundaries 50 in FIG. 4. As shown in FIG. 5, the translated localized boundaries 60 are localized boundary boxes 61. However, in alternative embodiments, a translated localized boundary can have any suitable shape, such as a shape that is the same as, or different than, the shape of a localized boundary, circular, oval, rectangular, square, and any other shape considered suitable for a particular embodiment.

Based upon the position of the translated localized boundaries 60 relative to the seat specific map 52 (e.g., the portions 58 of the baseline model 54 of the vehicle seat 12), a predetermined path for an automated device is selected to correct the portions 42 of the vehicle seat 12 that have defects 44. In the illustrated embodiment, based upon the position of the translated localized boundaries 60 relative to the seat specific map 52 (e.g., the subset of baseline seat panels 62 of the plurality of baseline seat panels 56 that correspond to the subset of seat panels 48 of the plurality of seat panels 46 that have the defect 44 within the image 40 of the vehicle seat 12), a predetermined path for an automated device is selected to correct the subset of seat panels 48 of the plurality of seat panels 46 that have a defect 44. The predetermined path includes the portions 42 of the vehicle seat 12 that have defects 44. In alternative embodiments, the predetermined path includes only the portions 42 of the vehicle seat 12 that have defects 44. While a localized boundary and translated localized boundary have been used to select a predetermined path for an automated device to correct a defect, alternative embodiments can use a manual defect location input (e.g., manual positioning of a localized boundary, manual positioning of a translated localized boundary) to select a predetermined path for an automated device to correct a defect. A predetermined path can be defined manually or automatically (e.g., using feedback data from a feedback loop generated by imaging before and after correcting a defect, or a portion thereof, and optimizing the path accordingly).

Figure 6:
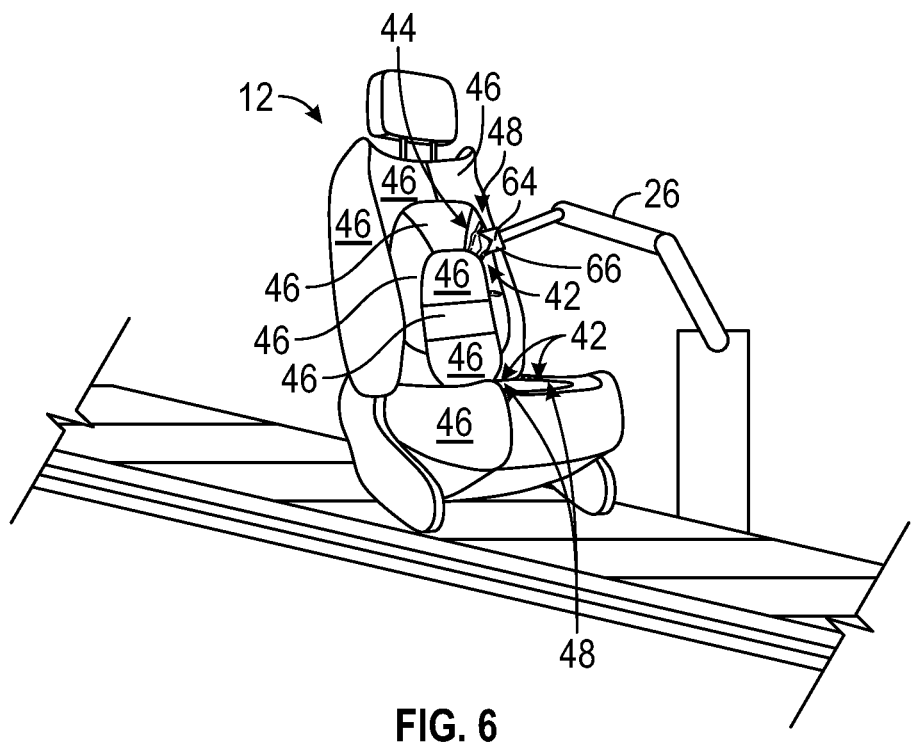
FIG. 6 is a partial perspective view of the vehicle seat shown in FIG. 2 positioned within a vehicle seat correction station.

FIG. 6 illustrates another step in a method of correcting a defect in a vehicle seat 12. As shown therein, a first automated device 26 is provided and actuated to correct the portions 42 of the vehicle seat 12 that have defects 44 using the predetermined path for the first automated device 26 (e.g., defect-driven location correction), described herein. In the illustrated embodiment, the automated device 26 is provided and actuated to correct the subset of seat panels 48 of the plurality of seat panels 46 that have defects 44 using the predetermined path for the first automated device 26. In alternative embodiments, a first automated device can be provided and actuated to correct only the portions of a vehicle seat that have defects using a predetermined path for the first automated device.

In the embodiment illustrated, the first automated device 26 corrects the defects 44 by finessing the portions 42 of the vehicle seat 12 that have the defects 44 using a heat source 64 and a source of compressed air 66. The heat source 64 and the source of compressed air 66 are actuated simultaneously to accomplish finessing of the portions 42 of the vehicle seat 12 that have the defects 44. The compressed air is applied to the vehicle seat 12 and is disposed around, or adjacent to, the heat source 64 and is used to cool the portions of the vehicle seat 12 not being finessed, which reduces the potential for damage to the vehicle seat 12 (e.g., seams and seat panels). In addition, use of a source of compressed air provides a mechanism to rapidly cool and set finessed seat panels. Use of an automated device allows for temperature and time controlled correction of defects 44. While a heat source 64 and a source of compressed air 66 have been illustrated as accomplishing correction of the portions 42 of the vehicle seat 12 that have defects 44, correcting one or more portions of a seat can be accomplished using any suitable technique and/or method, or such that a heat source is actuated separately from a source of compressed air. For example, correction of defects on a vehicle seat can be accomplished using a heat source, such as those selected from the group consisting of an infra-red oven, infra-red gun, infra-red heating head, a steam iron, and a hot air gun, sources of compressed air, steam heads, and any other tool considered suitable for a particular embodiment. Optionally, another step in a method of correcting a defect in a vehicle seat includes actuating a second automated device such that compressed air is applied to the portion of the vehicle seat that was corrected by the first automated device (e.g., using the predetermined path) to further cool and set the portions of the vehicle seat that have been corrected.

Figure 7:
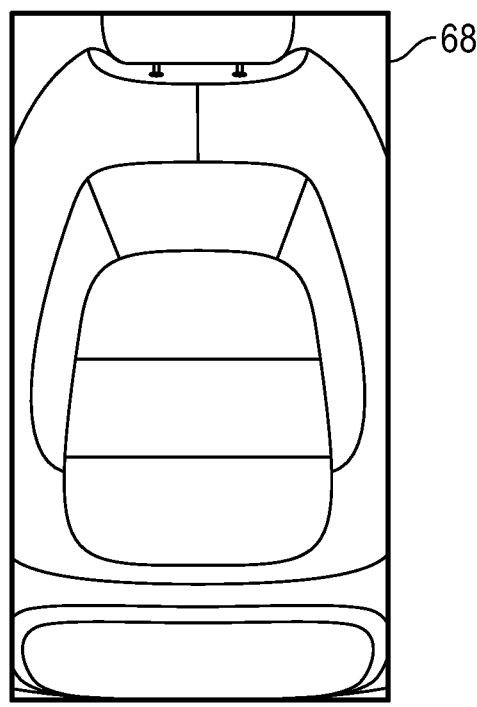
FIG. 7 is another image of the vehicle seat shown in FIG. 2. The defects in the vehicle seat have been corrected.

FIG. 7 illustrates another step in a method of correcting a defect in a vehicle seat 12. The vehicle seat 12 is positioned within a second vehicle seat inspection station, such as second vehicle seat inspection station 20 illustrated in FIG. 1. One or more light sources of a plurality of light sources and one or more imaging devices of a plurality of imaging devices are actuated such that a second image 68 of the vehicle seat 12 is obtained by the one or more of the plurality of imaging devices. FIG. 7 illustrates the second image 68 of the vehicle seat 12 obtained by the one or more of the plurality of imaging devices. As shown in FIG. 7, the image 68 illustrates that the defects 44 in the vehicle seat 12 that were previously present, as shown in FIG. 3, have been corrected and are no longer present. However, in alternative embodiments, if defect were detected within the second image, a method of correcting a defect in a vehicle seat, such as those described herein, can be repeated to correct the defect.

The illustration of any component, element, or feature as being disposed above, below, left of, or right of another component, element, or feature is only with reference to the relative location of the components, elements, and features as shown in the figures in order to aid in describing the vehicle seat correction systems and methods of correcting a defect in a vehicle seat. Accordingly, the components, elements, or features illustrated and described herein can be oriented in any manner desired without departing from the spirit or scope of the invention.

Various methods of correcting a defect in a vehicle seat are shown and described herein. While the methods of correcting a defect in a vehicle seat are shown and described as a series of acts, it is to be understood and appreciated that the methods are not limited by the order of acts, as some acts may in accordance with these methods may be omitted, occur in the order shown and/or described, occur in different orders, and/or occur concurrently with other acts described herein.

The steps and/or actions described herein can be completed using any suitable technique and/or method. For example, a controller, or other components known to skilled artisans, can be included as part of a controller system and may be used to perform the steps described herein, or be included as part of a vehicle seat correction system. Control logic or functions performed by a controller may be represented by schematic illustrations of an example method of correcting a defect in a vehicle seat. The figures and description provided herein provide representative control strategies and/or logic that may be implemented using one or more processing strategies such as event-driven, interrupt-driven, multi-tasking, multi-threading, and the like. The control logic may be implemented in software, hardware, or a combination of software and hardware in one or more controllers.

Figure 8:
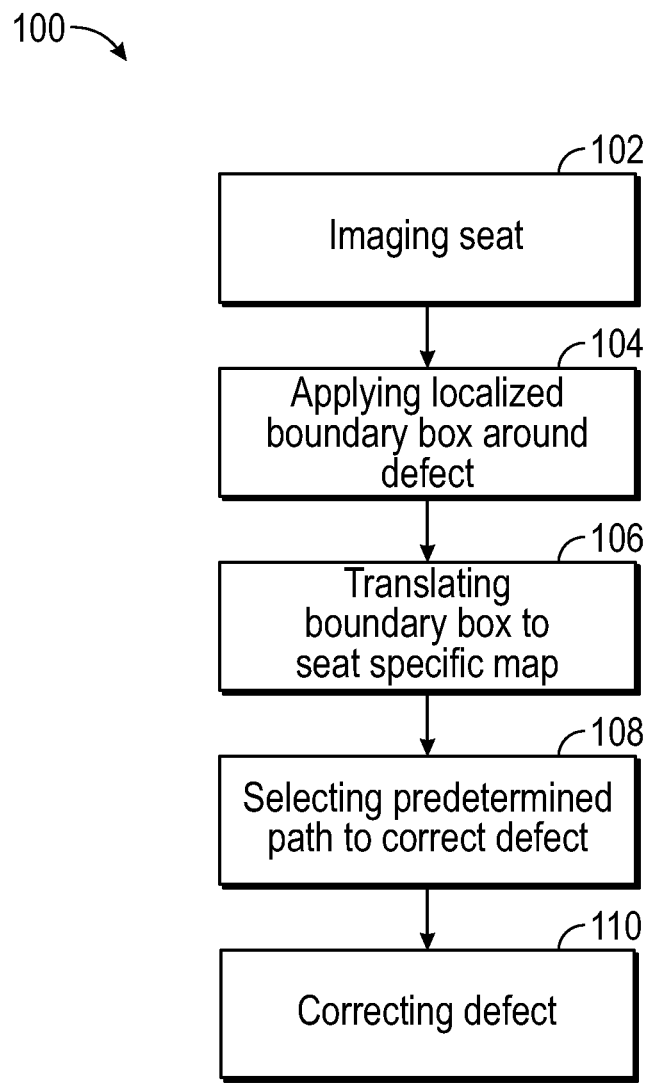
FIG. 8 is a schematic illustration of an example method of correcting a defect in a vehicle seat.

FIG. 8 is a schematic illustration of a method 100 of correcting a defect in a vehicle seat. Portions, or the entirety, of method 100 may be stored as an algorithm and/or control logic within a controller. A controller may be configured to implement the method 100 based on various states or conditions of an inspection station, a correction station, any component of an inspection station and/or correction station, and/or any other component that performs a step in method 100.

A first step 102 comprises imaging a seat to obtain an image of the seat. A portion of the seat has a defect. Another step 104 comprises applying a localized boundary around the portion of the seat that has the defect within the image of the seat. Another step 106 comprises translating the localized boundary into a seat specific map of a baseline model of the seat such that a portion of the baseline model of the seat that corresponds to the portion of the seat that has the defect within the image of the seat is disposed within a translated localized boundary. Another step 108 comprises selecting a predetermined path for an automated device to correct the portion of the seat that has the defect based on the portion of the baseline model of the seat. Another step 110 comprises correcting the portion of the seat that has the defect using the automated device and the predetermined path for the automated device.

With respect to step 102, if a vehicle seat being imaged does not have a defect, the method is complete and the vehicle seat can proceed to the next station or be shipped for installation into a vehicle. In an alternative embodiment, step 102 can be repeated after step 110 to determine whether the defect has been corrected. If the defect has not been corrected, each of step 102, step 104, step 106, and step 108, and step 110, can be repeated. If the defect has been corrected, the method is complete and the vehicle seat can proceed to the next station or be shipped for installation into a vehicle.

With respect to step 106, a seat specific map of a baseline model of a vehicle seat can be created in any suitable format. For example, a baseline model of a vehicle seat that includes a baseline seat panel, or a plurality of baseline seat panels, can be formatted as an RGB color map such that each baseline seat panel is a distinct color. Alternatively, a baseline model of a vehicle seat that includes a baseline seat panel, or a plurality of baseline seat panels, can initially be formatted as an RGB color map and then converted into a greyscale map such that each baseline seat panel is a distinct tone within the greyscale. This approach allows for the identification of distinct panels of the baseline seat panels disposed within a localized boundary that has been translated into the baseline model of the vehicle seat.

Figures 9, 10, 11:
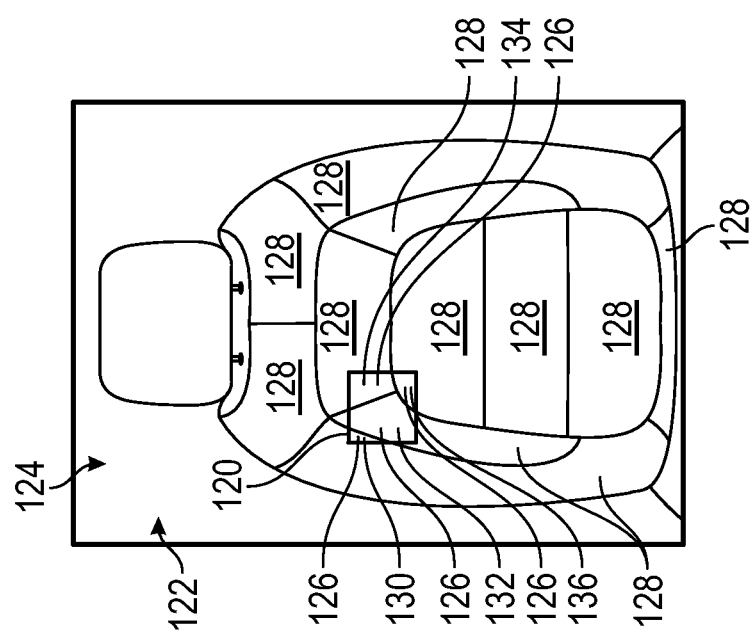
FIG. 9 is a seat specific map of a baseline model of a vehicle seat. A localized boundary has been translated into the seat specific map.
FIG. 10 is a table illustrating the portions of each of the baseline seat panels disposed within the translated localized boundary illustrated in FIG. 9.
FIG. 11 is a table illustrating a value count of the portions of each of the baseline seat panels disposed within the translated localized boundary illustrated in FIG. 9.

FIG. 9 illustrates a localized boundary box 120 translated into a baseline model 122 of a vehicle seat 124 such that a subset of baseline seat panels 126 of the plurality of baseline seat panels 128 is disposed within the translated localized boundary box 120. In the embodiment illustrated, a first seat panel 130, a second seat panel 132, a third seat panel 134, and a fourth seat panel 136 is disposed within the translated localized boundary box 120.

In an alternative embodiment, a step that can be completed subsequent to step 106 comprises assigning a distinct value to portions of each baseline seat panel disposed within the translated localized boundary and identifying each baseline seat panel that has a value count disposed within the translated localized boundary box that is greater than a threshold. Any suitable portion of a baseline seat panel can be assigned a value, such as a pixel, a plurality of pixels, or a defined pixel count. In the illustrated embodiment, each portion of each baseline seat panel are the same (e.g., include the same pixel count). However, in alternative embodiments, each portion of each baseline seat panel can be different from one another. A value associated with a portion of a baseline seat panel can be any suitable value, such as a randomized number, or a value associated with the color or greyscale tone. As shown in FIG. 10, the portions of the first seat panel 130 have been assigned a value of 75, the portions of the second seat panel 132 have been assigned a value of 125, the portions of the third seat panel 134 have been assigned a value of 175, and the portions of the fourth seat panel 136 have been assigned a value of 200. FIG. 11 illustrates the number of portions of each baseline seat panel disposed within the translated localized boundary box. As shown in FIG. 11, a value count indicates that six portions of the first seat panel 130 are disposed within the translated boundary box, thirty-seven portions of the second seat panel 132 are disposed within the translated boundary box, eighteen portions of the third seat panel 134 are disposed within the translated boundary box, and nineteen portions of the fourth seat panel 136 are disposed within the translated boundary box. In the illustrated embodiment, the threshold is 10. Therefore, the first seat panel 130 will be ignored and each of the second seat panel 132, the third seat panel 134, and the fourth seat panel 136 will be corrected, as described herein. In this alternative embodiment, step 108 will be accomplished subsequent to identifying each baseline seat panel that has a value count disposed within the translated localized boundary box that is greater than a threshold and comprises selecting a predetermined path for an automated device to correct the seat panels having the defect based on each baseline seat panel that has the value count greater than the threshold. While a particular threshold has been described, any suitable threshold can be used to determine whether a seat panel should be corrected. For example, a threshold can be manually set and manipulated according to quality standards and/or can include thresholds that are greater than, less than, or about 20, 30, 40, 50, 100, 200, 300, 400, and 500.

The vehicle seat correction systems and methods of correcting a defect in a vehicle seat described herein are considered advantageous at least because they reduce the labor required to correct defects within a vehicle seat and correct only the portions of the vehicle seat that have defects, which reduces the overall costs associated with manufacturing a vehicle seat. In addition, the systems and methods described herein provide mechanisms for controlling the amount of heat surface materials are exposed to (e.g., temperature and time) and increasing the quality standards applied during a vehicle seat inspection process and correction process, which can reduce waste, rectification costs, and inconsistencies in inspection standards.

Those with ordinary skill in the art will appreciate that various modifications and alternatives for the described and illustrated embodiments can be developed in light of the overall teachings of the disclosure, and that the various elements and features of one example described and illustrated herein can be combined with various elements and features of another example without departing from the scope of the invention. Accordingly, the particular examples disclosed herein have been selected by the inventor(s) simply to describe and illustrate examples of the invention and are not intended to limit the scope of the invention or its protection, which is to be given the full breadth of the appended claims and any and all equivalents thereof.

What is claimed is:

1. A method of correcting a defect in a seat comprising the steps of:
   (a) imaging a seat to obtain an image of the seat, a portion of the seat having a defect;
   (b) applying a localized boundary around the portion of the seat having the defect within the image of the seat;
   (c) translating the localized boundary into a seat specific map of a baseline model of the seat such that a portion of the baseline model of the seat that corresponds to the portion of the seat having the defect within the image of the seat is disposed within a translated localized boundary;

(d) selecting a predetermined path for an automated device to correct the portion of the seat having the defect based on the portion of the baseline model of the seat disposed within the translated localized boundary; and (e) correcting the portion of the seat having the defect using the automated device and the predetermined path for the automated device.

2. The method of claim 1, wherein the defect is a wrinkle.

3. The method of claim 1, wherein the seat specific map is based on a trim geometry of the seat.

4. The method of claim 1, further comprising the step of imaging the seat after step (e) to determine whether the portion of the seat having the defect has been corrected.

5. The method of claim 1, wherein the image is a 2D image.

6. The method of claim 1, wherein step (e) comprises correcting only the portion of the seat having the defect using the automated device and the predetermined path for the automated device.

7. The method of claim 6, wherein the portion of the seat having the defect is a portion of a seat panel.

8. The method of claim 1, wherein step (e) comprises finessing the portion of the seat having the defect using the automated device and the predetermined path for the automated device.

9. The method of claim 8, wherein finessing the portion of the seat having the defect is accomplished using a heat source.

10. The method of claim 9, wherein the heat source is selected from the group consisting of an infra-red heating oven, infra-red gun, infra-red heating head, a steam iron, and a hot air gun.

11. The method of claim 9, further comprising applying compressed air to the seat while finessing the portion of the seat having the defect using the heat source.

12. The method of claim 9, further comprising applying compressed air on the portion of the seat having the defect after finessing the portion of the seat having the defect using the heat source.

13. The method of claim 1, wherein the seat has a plurality of seat panels; and
wherein the portion of the seat having the defect is a subset of seat panels of the plurality of seat panels.

14. The method of claim 13, wherein the subset of the plurality of seat panels is a single seat panel.

15. The method of claim 13, wherein the baseline model of the seat includes a plurality of baseline seat panels, each baseline seat panel of the plurality of baseline seat panels corresponding to a seat panel of the plurality of seat panels of the seat; and
wherein step (c) comprises translating the localized boundary into the seat specific map of the baseline model of the seat such that a subset of baseline seat panels of the plurality of baseline seat panels that correspond to the subset of seat panels of the plurality of seat panels having the defect within the image of the seat is disposed within the translated localized boundary.

16. The method of claim 15, wherein step (d) comprises selecting the predetermined path for the automated device to correct the subset of seat panels of the plurality of seat panels having the defect based on the subset of baseline seat panels of the plurality of baseline seat panels disposed within the translated localized boundary; and
wherein step (e) comprises correcting the subset of seat panels of the plurality of seat panels having the defect using the automated device and the predetermined path for the automated device.

17. The method of claim 15, wherein the baseline model of the seat is formatted as an RGB color map such that each baseline seat panel is a distinct color;
further comprising converting the RGB color map into a greyscale map;
further comprising assigning a distinct value to portions of each baseline seat panel of the subset of baseline seat panels disposed within the translated localized boundary;
further comprising identifying each baseline seat panel of the subset of baseline seat panels that has a value count disposed within the translated localized boundary that is greater than a threshold;
wherein step (d) comprises selecting the predetermined path for the automated device to correct the subset of seat panels of the plurality of seat panels having the defect based on each baseline seat panel of the subset of baseline seat panels that has the value count greater than the threshold;
wherein step (e) comprises correcting the subset of seat panels of the plurality of seat panels having the defect using the automated device and the predetermined path for the automated device.

18. The method of claim 17, wherein each portion of each baseline seat panel of the subset of baseline seat panels disposed within the translated localized boundary has a defined pixel count.

19. A method of correcting a defect in a seat comprising the steps of:
(a) imaging a seat having a plurality of seat panels to obtain an image of the seat, a subset of seat panels of the plurality of seat panels having a defect;
(b) applying a localized boundary around the subset of seat panels of the plurality of seat panels having the defect within the image of the seat;
(c) translating the localized boundary into a seat specific map of a baseline model of the seat that includes a plurality of baseline seat panels, each baseline seat panel of the plurality of baseline seat panels corresponding to a seat panel of the plurality of seat panels of the seat, the localized boundary translated such that a subset of baseline seat panels of the plurality of baseline seat panels that correspond to the subset of seat panels of the plurality of seat panels having the defect within the image of the seat is disposed within a translated localized boundary;
(d) selecting a predetermined path for an automated device to correct the subset of seat panels of the plurality of seat panels having the defect based on the subset of baseline seat panels of the plurality of baseline seat panels disposed within the translated localized boundary; and
(e) correcting only the subset of seat panels of the plurality of seat panels having the defect using the automated device and the predetermined path for the automated device.

20. A method of correcting a defect in a seat comprising the steps of:
(a) imaging a seat having a plurality of seat panels to obtain an image of the seat, a subset of seat panels of the plurality of seat panels having a defect;

(b) applying a localized boundary around the subset of seat panels of the plurality of seat panels having the defect within the image of the seat;
(c) translating the localized boundary into a seat specific map of a baseline model of the seat that includes a plurality of baseline seat panels, each baseline seat panel of the plurality of baseline seat panels corresponding to a seat panel of the plurality of seat panels of the seat, the localized boundary translated such that a subset of baseline seat panels of the plurality of baseline seat panels that correspond to the subset of seat panels of the plurality of seat panels having the defect within the image of the seat is disposed within a translated localized boundary;
(d) selecting a predetermined path for an automated device to correct the subset of seat panels of the plurality of seat panels having the defect based on the subset of baseline seat panels of the plurality of baseline seat panels disposed within the translated localized boundary, the automated device including a heat source;
(e) finessing only the subset of seat panels of the plurality of seat panels having the defect using the heat source and the predetermined path for the automated device;
(f) applying compressed air to the seat air while completing step (e); and
(g) imaging the seat after step (f) to determine whether the subset of seat panels of the plurality of seat panels having the defect has been corrected.

\* \* \* \* \*